United States Patent [19]

Maigret

[11] 4,037,237

[45] July 19, 1977

[54] EXPOSURE CONTROL APPARATUS

[75] Inventor: Robert J. Maigret, Warwick, R.I.

[73] Assignee: Eastman Kodak Company, Rochester, N.Y.

[21] Appl. No.: 631,272

[22] Filed: Nov. 12, 1975

[51] Int. Cl.² .............................................. G03B 7/08
[52] U.S. Cl. .................................... 354/51; 354/60 R
[58] Field of Search .................... 354/24, 50, 51, 60 R

[56] References Cited

U.S. PATENT DOCUMENTS

| | | | |
|---|---|---|---|
| 3,673,415 | 6/1972 | Yoshimura et al. | 354/51 |
| 3,860,936 | 1/1975 | Harvey | 354/51 |
| 3,924,263 | 12/1975 | Alessi | 354/50 |
| 3,961,341 | 6/1976 | Numata et al. | 354/51 |
| 3,962,708 | 6/1976 | Muramatsu | 354/51 |

Primary Examiner—L. T. Hix
Assistant Examiner—J. A. LaBarre
Attorney, Agent, or Firm—T. H. Close

[57] ABSTRACT

An exposure control circuit that produces a variable exposure interval depending upon scene brightness or a constant exposure interval proportional to a predetermined scene brightness, by providing a photocurrent proportional to the level of actual scene brightness and a reference current proportional to the predetermined scene brightness and, preferably automatically, selectively integrating the photocurrent or the reference current depending upon the relative magnitude of the currents. The integrated current provides a signal to produce a variable exposure interval related to actual scene brightness when the photocurrent is greater than the reference current, or provides a signal to produce a constant exposure interval when the photocurrent is less than the reference current. The selective integration may be disabled to permit only the photocurrent to be integrated over all scene brightness and thus produce an exposure interval related to actual scene brightness beyond the predetermined brightness.

4 Claims, 2 Drawing Figures

EXPOSURE CONTROL APPARATUS

BACKGROUND OF THE INVENTION

1. Field of the Invention

This invention relates to automatic exposure control circuits and in particular to a circuit utilizing a photocurrent to generate a timing signal in which a variable exposure interval having a maximum interval is obtained.

2. Description of the Prior Art

Automatic exposure control apparatus for use in cameras have generally functioned to evaluate scene brightness and regulate one or more exposure control parameters such as exposure duration or aperture size in correspondence with the level of scene brightness. Scene brightness evaluation is most often performed with light measuring circuits utilizing one or more photosensitive elements positioned in the camera to receive scene illumination. When utilizing the apparatus to control exposure duration, the system typically integrates the output of a photosensitive circuit. When the integrated output reaches a predetermined level, the exposure is terminated. One circuit, for example, includes an R-C network, the resistor component of which is provided by a photocell, whose resistance is functionally related to scene brightness. Another system uses a photovoltaic cell and operational amplifier having capacitive feedback to provide an integrated output of the cell photocurrent. By activating either of the example integration circuits simultaneously with opening of a shutter, the arrangement generates a voltage at the output of the integration circuit that varies at a rate related to scene brightness. A voltage sensitive trigger circuit is responsive to the output of the integration circuit to terminate exposure when such voltage reaches a predetermined level.

When utilizing such automatic exposure control apparatus in very low light conditions, without the use of an auxiliary lighting unit or tripod, the resulting exposure time may well be beyond the limit of time that the average camera operator is capable of holding a camera steady. Blurred photographs result. To prevent such inadvertent blurred photographs, a limited maximum exposure time is incorporated into some automatic cameras; that is, the exposure duration is permitted to vary from the shortest interval to, for example, an interval of approximately 1/30 sec. as scene brightness decreases. At lower levels of scene brightness, all exposures are accomplished at 1/30 sec.

The most general technique for limiting the exposure duration in such cameras, while permitting the interval to vary over a range of intervals between the minimum exposure interval and an exposure interval that corresponds to the hand-held limit is to employ two timing circuits. A first timing circuit utilizing a photosensitive element and capacitor integrates a current proportional to scene brightness to provide a voltage which reaches the triggering value at a time corresponding to the scene brightness. A second timing circuit uses a fixed resistance and a capacitor to provide a rising voltage that reaches the desired triggering value in a predetermined time. Whichever voltage reaches the trigger value first will terminate the exposure. Thus if scene brightness is normal, the exposure interval provided by the first timing circuit (integrated current proportional to scene brightness) will be shorter than that provided by the second timing circuit (integrated current proportional to the predetermined brightness) and the apparatus will operate to terminate the exposure prior to the maximum exposure interval. If scene brightness is lower than normal, the first timing circuit generates an exposure interval that is longer than the maximum; however, the second timing circuit operates to terminate the exposure at the maximum exposure interval.

The direct comparison of the outputs of the two timing circuits permits a smooth transition between the variable exposure interval and the constant, maximum exposure interval. However, two timing circuits are required, each requiring a capacitor for integrating a current. The capacitor is large, particularly as viewed in integrated circuit technology, and expensive. Thus, it is advantageous from a space and cost standpoint to perform the integration in a single capacitor.

SUMMARY OF THE INVENTION

Therefore, it is an object of the present invention to provide improved exposure control apparatus that produces a variable exposure interval related to actual scene brightness and having a maximum interval related to a predetermined scene brightness, after which exposure is constant.

The present invention contemplates the use of an exposure control circuit that produces a variable exposure interval proportional to a predetermined scene brightness, by providing a photocurrent proportional to the level of actual scene brightness and a reference current proportional to the predetermined scene brightness and, preferably automatically, selectively integrating the photocurrent or the reference current depending upon the relative magnitude of the currents. The integrated current provides a signal to produce a variable exposure interval related to actual scene brightness when the photocurrent is greater than the reference current, or provides a signal to produce a constant exposure interval when the photocurrent is less than the reference current.

In one embodiment of the invention, a current proportional to the difference between the photocurrent and reference current is applied to one terminal of a diode. The other terminal of the diode is coupled with an integrating circuit to which a current proportional to the photocurrent is also coupled. When the photocurrent is greater than the reference current, as during normal scene brightness, the difference current represents a value that reverse biases the diode; therefore, only the photocurrent becomes integrated and an exposure interval lying between the minimum exposure interval and a maximum exposure interval may be obtained. When the photocurrent is less than the reference current, the difference current represents a value that forward biases the diode and is added to the photocurrent to produce a resultant current, equal to the reference current, that is integrated; a constant, maximum exposure interval for all levels of scene brightness below a predetermined value results.

A normally open switch is coupled between ground and the terminal of the diode that is coupled with the reference current and photocurrent. When the switch is closed that terminal of the diode is shunted to ground and only the photocurrent is integrated. An exposure time related to actual scene brightness beyond the predetermined brightness is provided.

BRIEF DESCRIPTION OF THE DRAWINGS

The invention, and its objects and advantages will become more apparent in the detailed description of the preferred embodiment presented below in conjunction with the drawings in which.

DESCRIPTION OF THE PREFERRED EMBODIMENT

In accordance with the present invention, the exposure control circuit generates a timing signal for shutter control that is useful in cameras, printers or other apparatus requiring regulation of a shutter in relation to light intensity. However, other functions such as light level check and exposure aperture control may be easily added to the circuit, as will be obvious from the following discussion. Basically, the exposure control circuit comprises a Photometric section that generates a current related to scene brightness, an Amplification and Expansion section that raises the current to a working level and provides a number of current outputs, a Current Processing section that generates a timing signal, and a Trigger Circuit.

Figure 1:
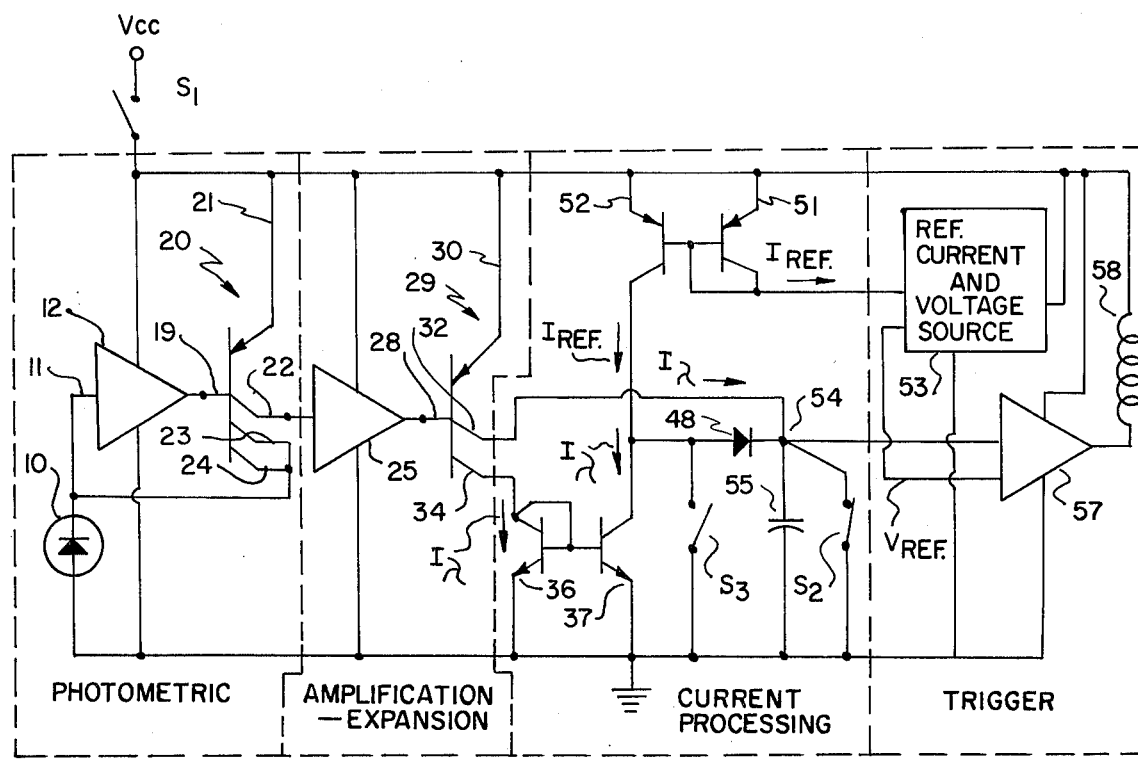
FIG. 1 shows an exposure control circuit of the present invention.

Referring to FIG. 1, the Photometric section, in its basic configuration, includes a photovoltaic cell such as a silicon photodiode 10, that may be mounted upon the camera structure in order to evaluate light levels of the scene coincident with the field of view of the camera. The output of the photodiode 10 is inserted into an input 11 of a current amplifier 12 that measures the short circuit current of the photodiode 10.

It is well known to couple a photodiode with an amplifier so that the output characteristics of the photodiode 10 may be considered linear and be useful in light level measurement. Conventionally, the photodiode 10 is operated into an operational amplifier having a feedback from the output to the input of the amplifier such that the photodiode 10 is zero biased, i.e., no voltage drop appears across the photodiode 10 when the system is balanced. Such systems measure the short circuit current of the photodiode and are referred to as current-to-voltage converters. One such example may be found in commonly assigned U.S. Pat. No. 3,053,985 issued to R. A. Grammer et al.

The present invention contemplates the direct use of the photodiode short circuit current in exposure control. To process the short circuit current of the photodiode 10, the amplifier 12 may be any one of a number of integrated circuit devices known for amplifying a current input thereto and having the feature of cooperating with the photodiode 10 such that the photodiode 10 is zero biased during a balanced state of the circuit. Such amplifiers contemplated by the present invention are single-ended input devices referenced to a single supply, VCC; however, such application is not limited to single-ended input amplifiers. The amplifier 12 preferably has unity gain such that its output current is equal to the short circuit current of the photodiode 10.

To provide currents for use in zero biasing the photodiode 10 and to be used by the Current Processing section to develop a timing current, the output current from the amplifier 12 is coupled to the base 19 of a multicollector PNP transistor 20. In the present application of a device such as the transistor 10, its emitter 21 is coupled to VCC and each of three collectors 22, 23, 24 has an equal percentage of the total emitter current flowing in the device. Two collectors 23, 24 are coupled back to the cathode of the photodiode 10 and provide a feedback to the amplifier 12 and the photodiode 10 that is equal to twice the output current from the amplifier 12. The amplifier 12 is designed such that the current flowing in collectors 23, 24 will divide equally between the amplifier 12 and the photodiode 10, during a balanced state of the circuit. During such balanced state of the circuit, the photodiode 10 is zero biased. During an unbalanced state of the circuit, as when light impinging onto the photodiode 10 increases, the photodiode 10 will attempt to generate a higher short circuit current than the current at the output of the amplifier 12. As a result, the photodiode 10 begins to operate in a photovoltaic mode in which it exhibits a forward voltage. In such a mode, the cathode of the photodiode 10 becomes slightly negative. The photodiode 10 will have more voltage across it than the amplifier 12, causing the current distribution between the amplifier 12 and photodiode 10 to become offset. The currents in the collectors 23, 24 have not changed and provide twice the output current of the amplifier 12; thus a net current appears at the input 11 of the amplifier 12 that creates a net increase in the current at the output of the amplifier 12. The net current at the output of the amplifier 12 biases the transistor 20 to increase the value of the current in the collectors 23, 24 until the division of current between the photodiode 10 and amplifier 12 becomes equal, i.e., the circuit is balanced.

The current flowing in the collector 22 is considered to be the output of the Photometric section, and is coupled with the Amplification and Expansion section. To raise the current in the collector 22 to a working current level, the collector 22 is coupled to an amplifier 25 which may be a conventional current amplifier, reference to VCC. The current at the output of the amplifier 25 is coupled to the base 28 of a second multicollector PNP transistor 29. The emitter 30 is coupled to VCC, and each collector 32, 34 carries an equal share of the current flowing in the emitter circuit. The current flowing in the emitter-collector circuit of the transistor 29 is functionally related to the short circuit current of the photodiode 10 by gain factors in the Photometric and Amplification and Expansion sections and will hereafter be referred to as the photocurrent $I\lambda$. Thus as many may be seen, equal photocurrents are available from the Amplification and Expansion section for use in the Current Processing section.

Briefly, the Current Processing section, couples a reference current source and a photocurrent source to a diode such that the diode provides a current, which will be referred to as a difference current, only when the photocurrent is less than the reference current, and the sums the difference current with an additional photocurrent which is then applied to an integrating circuit. Thus when the photocurrent is less than the reference current, a current equal to the reference current is integrated; however, when the photocurrent is greater than the reference current, the photocurrent is integrated. The photocurrent source is the collector 34 of the transistor 29, coupled to, for example, a so-called "current mirror" comprising two NPN transistors 36, 37 that are coupled together base-to-base, the transistor 36 having its collector coupled to its base. Since the bases and emitters of the transistors 36, 37 are directly connected, the transistor 37 will attempt to draw a collector current identical to that of transistor 36; i.e., Iλ. Thus, a photocurrent flowing from the collector 34 through the collector of the transistor 36 is mirrored in the collector of the transistor 37. The reference current source is a PNP current mirror consisting of ransistors 51, 52, coupled with a constant Current and Voltage Source 53 of any known design. The constant current supplied by the source 53 is coupled to the collector of the transistor 51, and is mirrored in the collector of the transistor 52 to provide the reference current, indicated as $I_{Ref}$ in FIG. 1 for clarity. The reference current is of level proportional to a predetermined scene brightness, and determines a transition point of the timing circuit, i.e., a point at which the exposure interval goes from a variable interval to a constant interval. To permit a smooth transition between the variable interval and the constant interval, the collectors of the transistors 37, 52 are coupled to the anode of a diode 48 that acts as an electronic switch. The diode 48 passes a current that is proportional to the difference between the reference current and the photocurrent when the magnitude of the reference current is greater than that of the photocurrent, and blocks the passsage of current when the reference current is less than the photocurrent. The cathode of the diode 48 is coupled to a summing node 54, to which the collector 32 of the transistor 29 is also coupled. The node 54 is coupled to a capacitor 55 that has one side connected to ground. The capacitor 55, and thus the node 54 are shunted to ground by a normally close switch $S_2$. The timing cycle is initiated by opening the switch $S_2$. One skilled in the art can readily see that the polarity of the element such as the diode 48, PNP and NPN current mirrors, and the other necessary elements may be reversed and the same results obtained. In such case the capacitor 55 may be initially charged and permitted to discharge upon opening the switch $S_2$.

The node 54 is connected to one terminal of a trigger circuit 57. A second input terminal of the trigger circuit 57 is coupled to a reference voltage that is related to the threshold of the trigger circuit 57. The reference voltage is supplied by the Reference Current and Voltage Source 53. The trigger circuit 57 may be a conventional high gain differential comparator circuit having a single-ended output. The function of the trigger circuit 57 is to compare the voltage appearing at the node 54 with the fixed reference voltage. When the voltage at the node 54 exceeds the reference voltage, the output of the trigger circuit 57 is switched to a nonconducting state thereby terminating the flow of current through a coil 58.

The development of a timing signal will first be considered during operation when scene brightness is normal and the relative magnitude of the photocurrent is greater than that of the reference current. In such case, the transistor 37 saturates because it cannot obtain sufficient operating current from the transistor 52. When the transistor 37 saturates, the potential at the anode of the diode 48 is lowered toward ground and the diode 48 becomes reversed biased. The diode 48, being reversed biased, does not pass current to the node 54, and only the photocurrent from the collector 32 charges the capacitor 55 after the switch $S_2$ is opened. An exposure of shorter duration than the maximum will result. On the other hand, if scene brightness is bleow normal, the relative magnitude of the reference current exceeds that of the photocurrent. The diode 48 thus becomes forward biased and passes a current to the node 54 that is equal to the difference between the reference current and the photocurrent. The photocurrent from the collector 32 also appears at the node 54. Upon opening the switch $S_2$, the current that charges the capacitor 55 is herefore equal to $I_{Ref} - I\lambda + I\lambda$, or is equal to the reference current. As previously stated, the reference current is of level related to a predetermined scene brightness, at which brightness the maximum exposure interval is desired. Thus, the charge on the capacitor 55 is related to the maximum exposure interval.

In the event that the limited time exposure is undesirable, such as during tripod mounting of the camera, a switch $S_3$, coupled between the anode of the diode 48 and ground, shunts the anode of the diode 48 to ground and the only current available to charge the capacitor 55 is the photocurrent from the collector 32. The resulting exposure may be of extended duration depending upon scene brightness.

Figure 2:
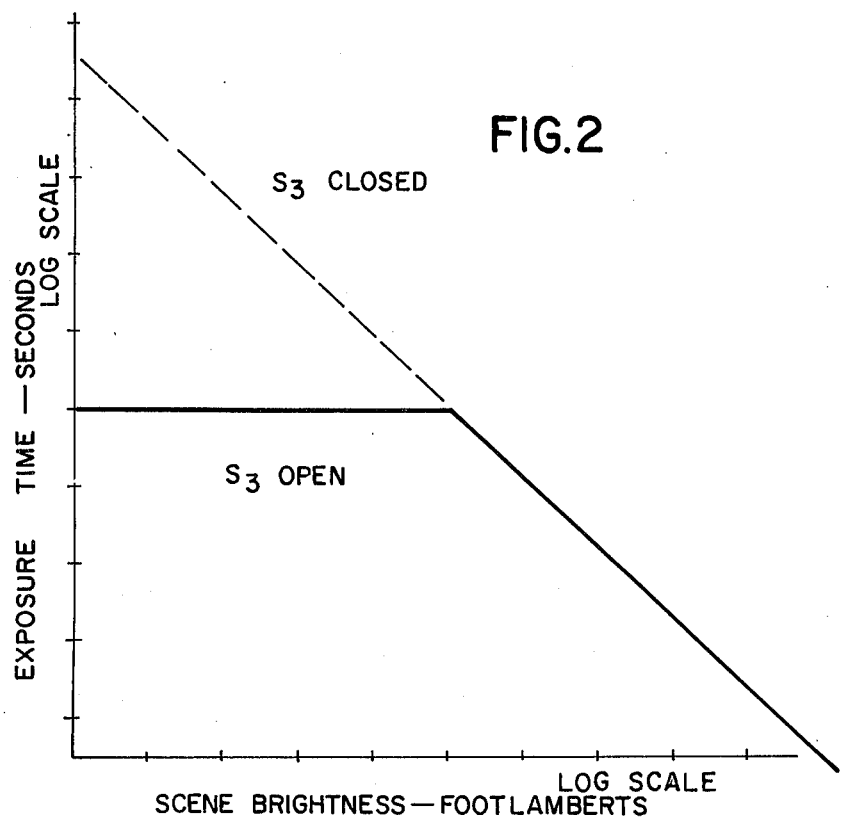
FIG. 2 shows an operating curve of exposure time produced by the circuit over a range of scene brightness.

A graph of exposure times provided by the circuit over a range of scene brightness may be seen by reference to FIG. 2. During operation of the circuit when the switch $S_3$ is open, the timing signal follows the solid curve as scene brightness decreases. At some predetermined level, for example at approximately 100Ft-lamberts illumination onto the photodiode 10, the signal becomes constant at approximately the exposure duration equivalent to the duration (c.g. 1/30 sec.) that the camera may be hand-held during the entire exposure. During operation of the circuit when the switch $S_3$ is closed, the timing signal does not become constant but continues in a straight line to provide an exposure in excess of the duration that the camera can be hand-held steady. During operation along the dotted line, a tripod should be used.

The invention has been described in detail with particular reference to preferred embodiments thereof, but it will be understood that variations and modifications can be effected within the spirit and scope of the invention.

I claim:

1. A photoresponsive timing circuit comprising :
   means for providing a photocurrent proportional to subject brightness;
   means for providing a reference current proportional to a predetermined subject brightness;
   an integrating circuit; and
   diode switch means coupling said reference current and said photocurrent with said integrating circuit and being responsive to the relative magnitudes of said reference current and photocurrent for selectively rendering said integrating circuit responsive to said reference current when said reference current is greater than said photocurrent and to said photocurrent when of a greater magnitude than said reference current.

2. An exposure control circuit comprising:
   means for providing a photocurrent of level proportional to actual scene brightness;
   means for providing a reference current of level proportional to predetermined scene brightness;
   a diode having first and second terminals;
   means for coupling said photocurrent to said first terminal of said diode;
   means for coupling said reference current and said photocurrent to said second terminal of said diode to forward bias said diode to provide a current therethrough equal to the reference current minus the photocurrent when said reference current exceeds said photocurrent, and to reverse bias said diode providing no current therethrough when said photocurrent exceeds said reference current;
means for forming the sum of said photocurrent and said current provided by said diode;
a capacitor coupled with said summing means to integrate the sum of said photocurrent and said current provided by said diode; and
trigger current means coupled with said capacitor and being responsive to the charge on said capacitor for regulating an exposure.

3. An exposure control circuit for a photographic camera, comprising:
photometric means responsive to scene light for producing a photocurrent proportional to scene brightness;
reference current generating means for generating a reference current proportional to a predetermined level of scene brightness;
a diode having first and second terminals;
means including first current mirror means having an input connected to said reference current generating means and an output connected to said first terminal of said diode and responsive to said reference current for supplying a current equal to said reference current to said first terminal of said diode;
means including second current mirror means having an input connected to said photometric means and an output connected to said first terminal of said diode and responsive to said photocurrent for drawing away from said first terminal a current equal to said photocurrent and for forwardly biasing said diode to provide a current to said second terminal equal to said reference current minus said photocurrent when said reference current exceeds said photocurrent, and for reverse biasing said diode and providing no current therethrough when said photocurrent exceeds said reference current;
means for supplying a current equal to said photocurrent to said second terminal of said diode;
means connected to said second terminal of said diode for integrating the total current at said second terminal;
trigger means connected to said integrating means and responsive to the integrated current for controlling an exposure.

4. An exposure control circuit for a photographic camera, comprising:
photometric means responsive to scene light for producing a photocurrent proportional to scene brightness;
means for expanding said photocurrent including a multicollector PNP transistor having a base to which said photocurrent is supplied and first and second collectors for supplying two equal currents which are proportional to said photocurrent;
means for generating a reference current proportional to a predetermined level of scene brightness;
a diode having an anode terminal and a cathode terminal, said first collector being connected to said cathode terminal;
a first current mirror having an input connected to said reference current generating means an output connected to said anode terminal of said diode, said first current mirror being responsive to said reference current for supplying a current equal to said reference current to said anode terminal of said diode;
a second current mirror having an input connected to said second collector and an output connected to said anode of said diode, said second current mirror being responsive to said current proportional to said photocurrent for attempting to draw a current equal to said current proportional to said photocurrent from said anode of said diode;
means connected to said cathode terminal of said diode for integrating the current thereat; and
trigger means connected to said integrating means and responsive to said integrated current for controlling an exposure.

* * * * *